United States Patent [19]

Moberg

[11] 4,394,719

[45] Jul. 19, 1983

[54] CURRENT CONTROL APPARATUS FOR A FLYBACK CAPACITOR CHARGER

[75] Inventor: Gregory O. Moberg, Rochester, N.Y.

[73] Assignee: Eastman Kodak Company, Rochester, N.Y.

[21] Appl. No.: 329,855

[22] Filed: Dec. 11, 1981

[51] Int. Cl.³ .................................... H02M 3/335
[52] U.S. Cl. .................................... 363/18; 363/131
[58] Field of Search .................... 315/209 T, 209 CD; 331/112; 363/18, 19, 131

[56] References Cited

U.S. PATENT DOCUMENTS

| | | | |
|---|---|---|---|
| 3,302,130 | 1/1967 | Minks | 363/18 X |
| 3,575,153 | 4/1971 | Hardin et al. | 363/18 X |
| 3,582,826 | 6/1971 | Del Zotto | 363/18 X |
| 3,765,391 | 10/1973 | Cook | 315/209 T X |

Primary Examiner—William M. Shoop
Attorney, Agent, or Firm—Dennis P. Monteith

[57] ABSTRACT

A DC to DC flyback converter for charging a capacitor in which the maximum current supplied from a battery to the converter's transformer is determined solely by the battery recovery voltage, circuit resistances, the transformer turns ratio and semiconductor junction voltages.

6 Claims, 1 Drawing Figure

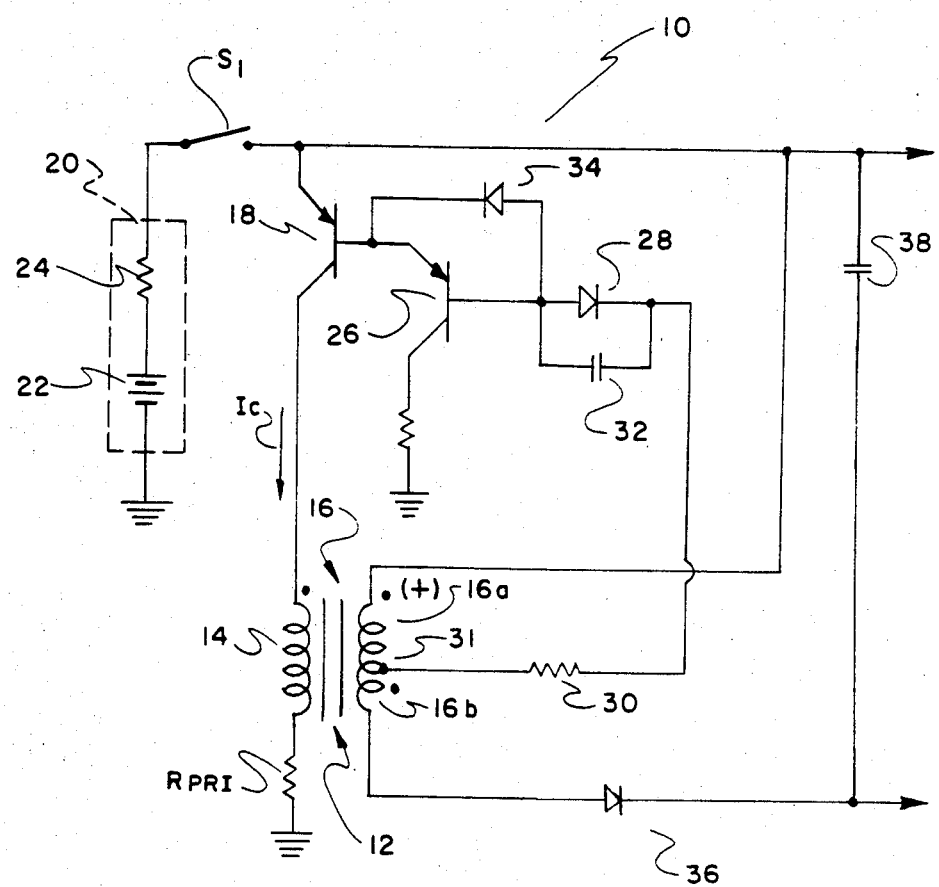

CURRENT CONTROL APPARATUS FOR A FLYBACK CAPACITOR CHARGER

Field of the Invention

This invention relates to a DC to DC converter for charging an energy-storage capacitor. More particularly, the invention relates to apparatus for controlling the rate of charge of a DC to DC "flyback" charger.

DESCRIPTION OF THE PRIOR ART

A flyback charger includes a transformer which stores energy when current is supplied to the transformer. A current sensing circuit interrupts the current when it reaches a predetermined magnitude and the transformer then delivers its stored energy to an energy storage capacitor in the form of a charging current. When all or a predetermined portion of the energy stored in the transformer has been delivered to the capacitor, current is again applied to the transformer and the cycle is repeated.

There are two somewhat conflicting requirements that govern the construction and operation of a DC to DC converter. First, it is desirable that the converter operate to charge the capacitor quickly. This permits rapid use of the energy stored in the capacitor. However, if the capacitor is charged as quickly as possible by applying maximum power, the power supply, typically a storage battery, can be overloaded, which reduces its total energy-delivery capacity. Secondly, it is desirable to transfer electric energy from the battery to the capacitor efficiently. This permits a greater number of charging cycles to be completed before the battery is exhausted. However, if the converter is operated solely on the basis of high power efficiency, the transfer of power from the battery to the capacitor may occur at a slow rate, so that the time required to charge the capacitor is excessive.

As a result of the aforementioned two conflicting requirements, in many cases, for example in charging the flash firing capacitor of an electronic strobe flash unit, the desired battery current magnitude at which current flow from the battery to the transformer is interrupted is determined by the product of power times efficiency. In other words, the point at which the product peaks establishes the desired battery current termination point. Having determined a particular battery current termination point that will produce the desired converter performance, the problem is to achieve precise control of the selected current termination point. Present methods of controlling the peak battery current include base current starvation of the oscillator transistor of the DC to DC converter and core saturation of the converter's transformer. The disadvantage of these methods is that they depend respectively on transistor properties, such as gain, and transformer properties, such as saturation, that are difficult to control accurately and economically.

SUMMARY OF THE INVENTION

The present invention provides a current control circuit for a DC to DC flyback converter in which the maximum current supplied from a battery to the primary winding of the transformer is determined solely by circuit resistances, the transformer turns ratio, semiconductor junction voltages and the battery recovery voltage. Because all of the aforementioned current determining parameters can be easily controlled by proper circuit design and fabrication, accurate current control for a flyback converter is achieved.

In a preferred embodiment of the invention, the primary winding of a transformer is located in the collector circuit of a first PNP power transistor. A second PNP high gain, signal transistor is coupled in emitter follower configuration to the base of the power transistor and a diode and a feedback current limiting resistor are connected in series between the secondary winding of the transformer and the base of the signal transistor. When current from the battery is applied to the base of the signal transistor it and the power transistor turn ON. The current in the power transistor's collector circuit (including the primary winding) then increases exponentially. As the collector current rises, the voltage across the primary winding falls and the feedback voltage from the secondary winding across the series diode and feedback resistor falls proportionately. Assuming the voltage drop across the feedback resistor required to keep the signal transistor ON to be negligible, when the feedback voltage reaches a predetermined reference value, which equals the sum of the two transistor' base-emitter junction voltages and the ON voltage of the diode, the drive current to the signal transistor goes to zero and the transistor turns OFF. When the signal transistor turns OFF, the power transistor in turn turns OFF. The advantage of the above described circuit is that the peak current flowing in the primary winding is determined solely by the recovery voltage of the battery, the predetermined reference voltage, the turns ratio of the primary and secondary windings, the internal resistance of the battery, the resistance of the primary winding and the saturation resistance of the power transistor, all of which can be easily and accurately controlled through proper circuit design and fabrication.

The invention and its features and advantages will become more apparent by referring to the accompanying drawing and to the ensuing detailed description of the preferred embodiment.

BRIEF DESCRIPTION OF THE DRAWING

The drawing is a schematic circuit diagram of a battery powered DC to DC converter according to the invention.

DETAILED DESCRIPTION OF THE PREFERRED EMBODIMENT

Because battery-powered DC to DC converters are well known, the present description will be directed in particular to elements forming part of, or cooperating directly with, apparatus in accordance with the present invention. It is to be understood that elements not specifically shown or described may take various forms well known to those having skill in the converter art.

The drawing shows a DC to DC converter 10 of the type known in the art either as a ringing choke converter or a flyback converter. The converter 10 includes a transformer 12 having like wound primary and secondary windings 14 and 16, respectively. A PNP power transistor 18 has its emitter electrode connected to a switch $S_1$, which is serially connecteed to a low-voltage battery 20, and its collector electrode connected in series to the primary winding 14. As shown, the battery 20 is represented as having a recovery voltage identified by the numeral 22 and an effective internal resistance, identified by the numeral 24. The term "battery recovery voltage" as used herein denotes the terminal voltage of the battery immediately after removal of the battery load (i.e. immediately after the transistor 18 turns OFF). Preferably, the battery 20 is of the type which provides a substantially constant recovery voltage throughout its useful life. A particularly useful battery 20 is a lithium battery.

A PNP signal transistor 26 is connected in emitter follower configuration to the base of the transistor 18. A diode 28 and a feedback current limiting resistor 30 are connected in series between a tap 31 on the secondary winding 16 and the base of the power transistor 18. A capacitor 32 connected in parallel with the diode 28 and a diode 34 connected across the emitter-base junction of the transistor 26, (as shown) provide rapid turn-OFF of the power transistor 18 in the manner described below. A diode 36 is connected in series to the secondary winding 16 for conducting a rectified charging current to charge a high-voltage capacitive load 38.

The flyback converter 10 is constructed and arranged to charge the capacitive load 38 to a maximum voltage of approximately 200 volts from the low-voltage battery 20, which may have a maximum recovery voltage 22 of approximately 5 volts.

The flyback converter 10 stores energy in the transformer 12 when the power transistor 18 is conducting (turned ON). The converter 10 transfers stored energy from the transformer 12 to the load 38 when the transistor 18 is not conducting (turned OFF). It is useful to describe the structure and operation of the flyback converter 10 in terms of "an energy storage cycle" and "an energy transfer cycle". The term "energy storage cycle" as used herein denotes the interval during which the power transistor 18 is conducting, whereby current flows from the battery 20 through the primary winding 14 of the transformer 12. The term "energy transfer cycle" as used herein denotes the interval during which the switch S₁ is closed, but the transistor 18 is not conducting, whereby battery current to the primary winding 14 is interrupted. During the energy transfer cycle, current flows through the secondary winding 16 and the diode 36 and the current charges the load 38. An energy transfer cycle immediately follows the preceding energy storage cycle. A single period of operation of the converter 10 is the duration of one energy storage cycle plus the duration of the immediately following energy transfer cycle. The converter 10 operates at an instantaneous frequency which is the reciprocal of its period.

The flyback converter 10 operates as follows. Assume that the switch S₁ is closed and that the transistors 18 and 26 are conducting. Assume also that the current through the resistor 30 is small (i.e., that transistor 26 has a high gain, e.g. a Beta greater than 250, so that it can be saturated with low drive current) and that the saturation of transistor 18 can be modeled as a series resistor. Therefore, current Ic flows from the battery 20 through the collector of the transistor 18, which is quickly driven into saturation, and through the primary winding 14. When the transistor 18 saturates, the current Ic increases exponentially, as long as the transformer core is not magnetically saturated. The corresponding time constant is equal to the inductance of the primary winding 14 divided by the resistance of the primary winding circuit, including the battery internal resistance 24; the primary winding resistance, $R_{PRI}$; and the saturation resistance, $R_{SAT}$, of transistor 18. For a time interval that is short relative to this time constant, it can be assumed that the current Ic increases approximately lineraly. As the current Ic rises, the voltage $V_{PRI}$ across the primary winding falls and the feedback voltage $V_{FB}$ across the upper portion 16a of the secondary winding 16 falls likewise, in proportion to the turns ratio of the upper portion 16a of the secondary winding to the primary winding 14. Dividing the secondary winding by means of tap 31 into an upper portion 16a and a lower portion 16b provides a lower turns ratio during the energy storage cycle, i.e. (N16a/N14), and a higher turns ratio during the energy transfer cycle, i.e. (N16a+N16b/N14). The higher turns ratio permits the use of a low voltage power transistor 18 having high gain and low drive current saturation.

If the size of the resistor 30 is correctly chosen, i.e., if it is large enough to limit power dissipation, yet small enough so that during the energy storage cycle it provides the minimum base drive required to maintain the transistor 26 saturated and during the energy transfer cycle provides a large current to rapidly turn OFF the power transistor 18, the collector current Ic will rise until the feedback voltage $V_{FB}$ falls to $V_{REF}$, which equals the sum of the voltage across the two base-emitter junctions of the transistors 18 and 26 and the ON voltage of the diode 28. At this voltage point, the drive current to the transistor 26 goes to zero and the transistor 26 turns OFF.

When the transistor 26 turns OFF, the capacitor 32 discharges through the diode 34 and resistor 30 and rapidly turns the power transistor 18 OFF. The energy stored in the upper portion 16a and lower portion 16b of the secondary winding is then delivered through the diode 36 to charge the capacitor 38.

From the above, it can be seen that the current Ic is determined solely by the recovery voltage of the battery, circuit resistances, the transformer turns ratio and the semiconductor junction voltages. The maximum collector current Ic can, therefore, be determined from the following equation:

$$Ic\ max = \frac{V_{CC} - (V_{REF}/K_{FB})}{R_{CC} + R_{PRI} + R_{SAT}}$$

where $V_{CC}$=the recovery voltage of the battery 20, $V_{REF}$=the predetermined voltage at which the base drive to transistor 26 goes to zero, which equals the sum of the forward base-emitter voltages of transistors 18 and 26 and the junction voltage of diode 28, $K_{FB}$=the turns ratio of the upper portion secondary winding 16a to the primary winding 14, $R_{CC}$=the internal resistance of the battery 20, $R_{PRI}$=the resistance of the primary winding 14, and $R_{SAT}$=the saturation resistance of the transistor 18.

The invention has been described in detail with particular reference to a preferred embodiment thereof, but it will be understood variations and modifications can be effected within the spirit and scope of the invention. For example, for use with an alkaline battery, which does not provide a substantially flat recovery voltage over its useful life, resistance can be added into the emitter circuit of transistor 18 to provide a decreasing $V_{REF}$ to compensate for the decrease in the battery recovery voltage as the battery ages.

I claim:

1. In a DC to DC converter adapted to be energized by a power supply, the converter comprising a transformer including a primary winding and secondary winding, and switching means including a power transistor having a base electrode, the power transistor being coupled between the power supply and the primary winding for periodically interrupting the power supply current to cause current to flow in the secondary winding, the improvement comprising:
  (a) a high gain, signal transistor having a base electrode, the signal transistor being coupled in emitter follower configuration to the base of the power transistor; and
  (b) a diode and a feedback current limiting resistor connected in series between the secondary winding and the base of the signal transistor.

2. The converter according to claim 1 wherein the gain of the signal transistor is greater than 250.

3. A DC to DC flyback converter adapted to be energized by a battery, the converter comprising:
  (a) a transformer having a primary winding and a secondary winding;
  (b) first and second like polarity transistors, the transistors each having base, emitter and collector electrodes with the first transistor having its emitter electrode connected to the battery and its collector electrode connected in series to the primary winding and the second transistor having its emitter electrode connected to the base electrode of the first transistor; and
  (c) a diode and a feedback current limiting resistor connected in series between the secondary winding and the base electrode of the second transistor.

4. The converter according to claim 5 wherein the size of the feedback current limiting resistor is chosen so that it limits power dissipation while providing the minimum base drive required to maintain the second transistor saturated and to rapidly turn off the first transistor.

5. The converter according to claim 3 further comprising a second diode connected between the anode of the first diode and the base of the first transistor and a capacitor connected in parallel with the first diode.

6. In a DC to DC converter adapted to be energized by a power supply having a substantially constant recovery voltage, the converter including a transformer having a primary winding and secondary winding and a power transistor having a base electrode and an emitter electrode, the power transistor being coupled between the power supply and the primary winding and having a conducting state for causing current to flow in the primary winding and a non-conducting state for causing current to flow in the secondary winding, the improvement comprising:
  (a) a second transistor of the same polarity as the power transistor having a base electrode and an emitter electrode with the emitter electrode connected to the base electrode of the power transistor for providing drive current to maintain the power transistor in the conducting state; and
  (b) a feedback path including a semiconductor device, which is turned on in response to a predetermined junction voltage, the feedback path being connected between the secondary winding and the base electrode of the second transistor and being responsive to a voltage across the secondary winding equal to the sum of the voltages across the base-emitter junction of the power transistor, the base-emitter junction of the second transistor and the predetermined junction voltage of the semiconductor device for causing the power transistor to switch to its non-conductive state.

* * * * *